US009882503B2

(12) United States Patent
Rauchenstein et al.

(10) Patent No.: US 9,882,503 B2
(45) Date of Patent: Jan. 30, 2018

(54) CHARGING OF SPLIT DC LINKS OF A CONVERTER SYSTEM (71) Applicant: ABB Technology Oy, Helsinki (FI)

(72) Inventors: Juerg Rauchenstein, Lachen (CH); Kefas Damazio-Coelho, Nussbaumen (CH); Matthias Lüscher, Gontenschwil (CH)

(73) Assignee: ABB Technology Oy, Helsinki (FI)

( * ) Notice: Subject to any disclaimer, the term of this patent is extended or adjusted under 35 U.S.C. 154(b) by 0 days.

(21) Appl. No.: 15/443,365

(22) Filed: Feb. 27, 2017

(65) Prior Publication Data
US 2017/0170742 A1 Jun. 15, 2017

Related U.S. Application Data (63) Continuation of application No. PCT/EP2015/069478, filed on Aug. 26, 2015.

(30) Foreign Application Priority Data

Aug. 26, 2014 (EP) .................................... 14182257

(51) Int. Cl.
H02J 3/36 (2006.01)
H02M 5/44 (2006.01)
H02M 5/45 (2006.01)

(52) U.S. Cl.
CPC .................... *H02M 5/44* (2013.01)

(58) Field of Classification Search
CPC ............ H02M 5/00; H02M 5/40; H02M 5/42; H02M 5/44; H02M 5/45; H02M 5/4505;
(Continued)

(56) References Cited

U.S. PATENT DOCUMENTS 6,072,707 A 6/2000 Hochgraf
7,929,323 B2 4/2011 Schmidt
(Continued)

FOREIGN PATENT DOCUMENTS

EP 2733837 A1 5/2014
EP 2747269 A2 6/2014
(Continued)

OTHER PUBLICATIONS

European Patent Office, International Search Report & Written Opinion issued in corresponding Application No. PCT/EP2015/069478, dated Nov. 16, 2015, 11 pp.
(Continued)

*Primary Examiner* — Gary L Laxton
(74) *Attorney, Agent, or Firm* — Taft Stettinius & Hollister LLP (57) ABSTRACT

A converter system comprises two phase modules, each phase module comprising a first converter leg and a second converter leg interconnected with a DC link, and a charging transformer for charging the DC link. The DC link comprises two capacitors connected in series between a positive point, a middle point and a negative point, each converter leg adapted for interconnecting an output with the positive point, the middle point or the negative point of the DC link. The phase modules are connected in series via outputs of the converter legs, such that a second converter leg of a lower phase module is connected with a first converter leg of a higher phase module. The charging transformer is connected to the middle point of the DC link of a highest phase module, which provides a phase output of the converter system with an output of a second converter leg. The converter system includes two converter phases, each converter phase comprising at least two series connected phase modules. At a star point of the converter phases the converter phases are
(Continued)

star-connected via outputs of first converter legs of lowest converter modules, which are series connected with higher converter modules, whereby a module side start point of the charging transformer is connected or is not connected with the star point of the converter phases.

20 Claims, 6 Drawing Sheets

(58) Field of Classification Search
CPC .............. H02M 5/451; H02M 5/452; H02M 2001/0067; H02J 3/36
See application file for complete search history.

(56) References Cited

U.S. PATENT DOCUMENTS

| | | |
|---|---|---|
| 8,223,515 B2 | 7/2012 | Abolhassani et al. |
| 8,254,076 B2 * | 8/2012 | Ledezma ................ H02M 7/49 361/118 |
| 2013/0176014 A1 | 7/2013 | Guan et al. |
| 2015/0249400 A1 | 9/2015 | Zuckerberger et al. |

FOREIGN PATENT DOCUMENTS

| | | |
|---|---|---|
| JP | 2011109801 A | 6/2011 |
| WO | 2012140008 A2 | 10/2012 |

OTHER PUBLICATIONS

European Patent Office, Extended Search Report issued in corresponding Application No. 14182257.7, dated Feb. 17, 2015, 6 pp.

* cited by examiner

CHARGING OF SPLIT DC LINKS OF A CONVERTER SYSTEM

FIELD OF THE INVENTION

The invention relates to the field of charging of DC links. In particular, the invention relates to a converter system as well as to a method and controller for charging a DC link of the converter system.

BACKGROUND OF THE INVENTION

Multilevel converter systems with series connected phase modules may be used in medium voltage drives. These converter systems are mainly used in the range of 3 kV to 15 kV, but may also be used in other voltage ranges. Every phase module may comprise an energy storage element in the form of a direct current capacitor or DC link capacitor. Usually, these elements need to be pre-charged every time the converter system starts to operate.

The charging of these elements is usually an operation that needs care, since a direct connection of the converter system without pre-charged DC link capacitors to a medium voltage grid would cause huge currents on the grid itself.

Several ways to charge the DC link capacitors may be used. Commonly, independent charging unit elements are directly connected to the DC link. These charging unit elements usually comprise voltage transformers connected to a low voltage supply, which transformers are placed in addition to an already present high power medium voltage transformer.

For example, U.S. Pat. No. 8,223,515 B2 shows a medium voltage system with an apparatus that embodies a charging transformer integrated (coupled) to the main transformer, in a way that the low voltage feed windings share the same transformer core. This low voltage feed windings are used as a pre-charge circuit.

In WO2012/140008A2 a medium voltage converter and a method to start up in a way to prevent inrush currents is presented.

In JP2011109801A a low voltage feed transformer element is specially connected to the medium voltage converter to pre-charge DC link capacitors.

U.S. Pat. No. 7,929,323 B2 shows a further example for an apparatus for pre-charging a power converter.

U.S. Pat. No. 6,072,707 discloses in FIG. 2 a converter system with two phase modules, each phase module comprising a first converter leg and a second converter leg interconnected with a DC link, wherein the DC link comprises two capacitors connected in series between a positive point, a middle point and a negative point, each converter leg being adapted for interconnecting its output with the positive point, the middle point or the negative point of the DC link. The phase modules are connected in series via outputs of the converter legs, whereby a second converter leg of a lower phase module is connected with a first converter leg of a higher phase module.

In US 2013/0176014 A1, EP 2 747 269 A2 and EP 2 733 837 A1 further generic converter systems are disclosed.

DESCRIPTION OF THE INVENTION

The object of the invention is to lower costs and to reduce the complexity of a charging system for an electrical converter with series connected phase modules.

This objective is achieved by the subject-matter of the independent claims. Further exemplary embodiments are evident from the dependent claims and the following description.

An aspect of the invention relates to a converter system. In general, the converter system may be a medium voltage system, for example adapted for processing voltages above 1.000 V. The converter system may be used for interconnecting an electrical machine, such as an electrical motor, with an electrical (medium voltage) grid.

According to an embodiment of the invention, the converter system comprises at least two phase modules, each phase module comprising a first converter leg and a second converter leg interconnected with a DC link, wherein the DC link comprises two capacitors connected in series between a positive point, a middle point and a negative point (i.e. the DC link also may be referred to as split DC link), each converter leg being adapted for interconnecting its output with the positive point, the middle point or the negative point of the DC link. The phase modules are connected in series via outputs of the converter legs, wherein a second converter leg of a lower phase module is connected with a first converter leg of a higher phase module. In general, the converter system may comprise two, three or more phase modules that are connected in series via the outputs of their converter legs.

The converter system furthermore comprises a charging transformer, which is connected to the middle point of the DC link of a highest phase module, which provides a phase output of the converter system with an output of a second converter leg.

Such a configuration makes it possible to charge all DC links of all converter modules via one charging transformer. In general, during charging, the converter legs of the phase modules are switched, such that a charging current may flow from the charging transformer through neutral connected converter legs through one selected DC link, which is selected by switching the respective first converter leg to an unconnected state, such that the charging current is forced to flow through free-wheeling diodes of the converter leg.

In such a way, the same charging transformer may be used independently of the number of series connected converter modules. Furthermore, the isolation requirement for the charging transformer is lower. The converter system comprises further at least two converter phases, each converter phase comprising at least two series connected phase modules. Usually, such a converter system may comprise three converter phases for providing rotating current. The converter phases may be star-connected via outputs of first converter legs of lowest converter modules, which are series connected (for example via further converter modules) with higher converter modules. A module side star point of the charging transformer is connected with the star point of the converter phases. The charging transformer may comprise at least two (usually three) primary side windings connected with a (low voltage) electrical grid, which are coupled with at least two (usually three) secondary side windings, which are connected with the middle points of the highest phase modules of the respective converter phases. The secondary side windings may be star-connected to form a module side star point and this star point may be connected with the star point of the converter phases. Alternatively, the module side star point of the charging transformer is not connected with the star point of the converter phases. In the case of three converter phases, the voltage at the star point of the converter phases may cancel, when DC link capacitors of all three phases are charged simultaneously. In such a case, no connection of the star points is necessary.

According to an embodiment of the invention, the converter legs are neutral point clamped converter legs, active neutral point clamped converter legs or neutral point piloted converter legs. All these types of converter legs have in common that they may be switched into a neutral connected state (in which their output is connected with the middle point of the DC link) and into an unconnected state (in which all semiconductor switches are open). These two states may be used for connecting one of the DC links with the charging transformer for charging.

According to an embodiment of the invention, each converter leg comprises a positive branch comprising two series connected semiconductor switches, each semiconductor switch connected in parallel to a free-wheeling diode and a negative branch comprising two series connected semiconductor switches, each semiconductor switch connected in parallel to a free-wheeling diode. The positive branch and the negative branch are connected in series between the positive point and the negative point of the DC link.

According to an embodiment of the invention, the output of the converter leg is connected via a diode between the semiconductor switches of the positive branch and via a diode between the semiconductor switches of the negative branch. This may be the case for a neutral point clamped converter leg. For an active neutral point clamped converter leg, these diodes may be connected in parallel to further semiconductor switches.

For a neutral point piloted converter leg, the middle point between the positive branch and the negative branch of the converter leg may be connected via further semiconductor switches and anti-parallel diodes with the middle point of the DC link.

According to an embodiment of the invention, the converter system comprises further a main transformer interconnected with a rectifier of each converter module, which is connected in parallel to the DC link. The main transformer may be a medium voltage transformer, while the charging transformer may be a low voltage feed transformer (below 1 kV). The AC voltage from the main transformer may be supplied via rectifiers to the DC link in each phase module.

According to an embodiment of the invention, a relay for disconnecting the transformer from the star point of the converter phases is interconnected between the star point of the transformer and the star point of the converter phases. This relay may be a high voltage relay, since the charging transformer may be used for stepping up the voltage from a low voltage grid to a high voltage suitable for charging the DC link capacitors.

Alternatively, there may be no high voltage relay, i.e. the star point of the transformer may be directly connected with the star point of converter phases.

According to an embodiment of the invention, the converter system comprises further a circuit breaker for connecting the charging transformer to a low voltage grid. This circuit breaker may be used for disconnecting the charging transformer, when no charging takes place.

A further aspect of the invention relates to a method for charging a DC link of series connected converter modules of a converter system as described in the above and in the following. For example, the method may be performed by a controller of the converter system during a start-up phase, which also controls the converter system during normal operation.

According to an embodiment of the invention, the method comprises: connecting the charging transformer to an electrical grid (for example via the circuit breaker); switching a (first) converter leg of a selected converter module into an unconnected state, in which all semiconductor switches of the converter leg are open; and switching remaining converter legs to a neutral connected state, in which the output of the converter leg is connected to the middle point of the DC link, such that a charging current flows via the neutral connected converter legs from the middle point of the DC link of the selected converter module through one of the capacitors of the DC link.

In other words, all converter legs in the series connected phase modules are switched such that the charging current may flow through the middle points of the DC links and the middle points of the converter legs except through one converter leg, which forces the charging current to flow in the direction of the positive or negative point (dependent on the actual polarity of the AC charging current). In the latter case, the charging current passes the respective DC link capacitor and charges it and then flows through free-wheeling diodes of opened semiconductor switches of the first converter leg of the selected converter module.

According to an embodiment of the invention, the switching of the converter leg of a selected converter module and the switching of the remaining converter legs is a first switching pattern for charging the DC link of the selected converter module. In other words, for charging a special, selected DC link, a special switching pattern may be used, in which the first converter leg associated with the DC link is switched to an unconnected state, while the other converter legs are switched to the neutral connected state.

According to an embodiment of the invention, the method further comprises: after a predetermined time interval, switching a further converter leg of a further selected converter module into an unconnected state and switching further remaining converter legs to a neutral connected state according to a second switching pattern. After a time interval, the switching pattern may be changed such that another DC link is charged.

According to an embodiment of the invention, converter modules of a converter phase are cyclically selected and the switching patterns are applied cyclically to the selected converter modules, such that the DC links of a converter phase are equally charged. Every cycle, i.e. every time interval for a switching pattern may last for the pre-determined time interval. The cycling may be repeated until the DC links are fully charged.

For charging all DC link capacitors, the converter modules of one converter phase may be cyclically selected and the corresponding switching pattern may be applied cyclically to the selected converter module, such that the DC links of a converter phase are equally charged. Furthermore, it may be possible that the converter modules of two or more converter phases are charged simultaneously.

According to an embodiment of the invention, the method comprises further switching the second converter leg of a highest converter module to the unconnected state. For completely disconnecting an electrical machine from the converter system during charging, the highest converter leg may be switched in the unconnected state.

A further aspect of the invention relates to a controller for a converter system, wherein the controller is adapted for performing the method as described in the above and in the following. For example, the method may be implemented in software or at least partially in hardware and/or may be run on a processor.

It has to be understood that features of the converter system as described in the above and in the following may be features of the method and/or controller as described in the above and in the following and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference numerals used in the drawings, and their meanings, are listed in summary form in the list of reference numerals. In principle, identical parts are provided with the same reference symbols in the figures.

DETAILED DESCRIPTION OF EXEMPLARY EMBODIMENTS

Figure 1:
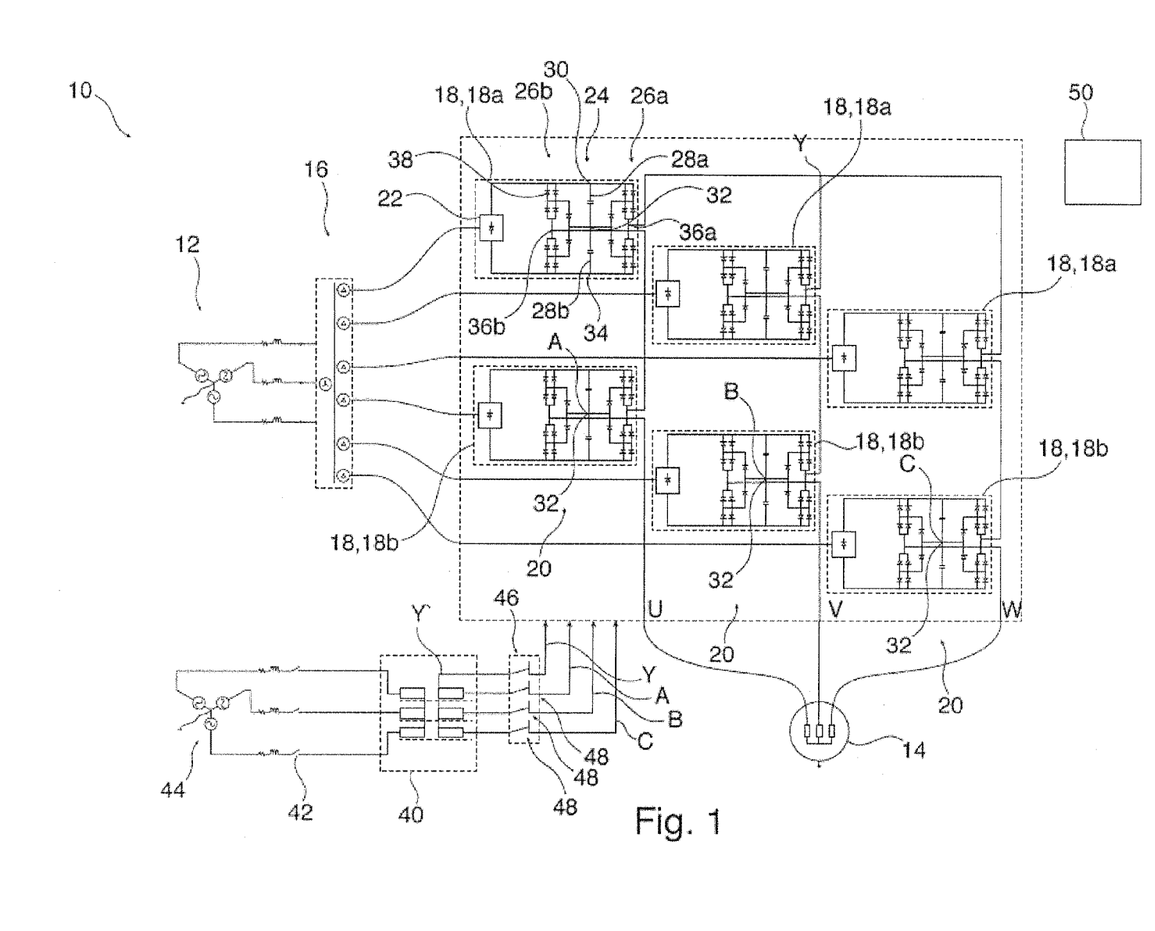
FIG. 1 schematically shows a converter system according to an embodiment of the invention.

FIG. 1 shows a multilevel converter system 10 interconnected between a medium voltage grid 12 and an electrical machine 14, such as an electrical motor or electrical generator. The converter system comprises a main transformer 16 with a primary winding that is connected to the electrical grid 12 and a plurality of secondary windings, each of which is connected with an input side of a phase module 18. The converter system 10 comprises two (in general more than one) phase modules 18 for each converter phase 20, which are connected in series at their output side.

Each phase module 18 comprises a (for example passive) rectifier 22, which rectifies an AC voltage from the main transformer 16, a DC link 24 that is supplied by the rectifier 22 and two converter legs 26a, 26b, which are connected in parallel to the DC link 24. The DC link 24 comprises two capacitors 28a and 28b connected in series between a positive point 30, a middle point 32 and a negative point 34. Each converter leg 26a, 26b has an output 36a, 36b, each of which may be connected to the positive point 30, the middle point 32 and the negative point 34 by suitable switching the semiconductor switches 38 of the respective converter leg 26a, 26b. For example, the switches 38 may be IGCTs.

Each converter phase 20 comprises a low phase module 18a and a high phase module 18b, which are series connected by the output 36b of the second converter leg 26b of the low phase module 18a and the output 36a of the first converter leg 26a of the high phase module 18b. In general, each converter phase 20 may comprise more than two series connected phase modules 18.

The low phase modules 18a are star-connected via the outputs 36a of their first converter legs 26a at the star point Y. The high phase modules 18b provide the phase outputs U, V, W of the converter phases 20 via the outputs 36b of their second converter legs 26b. These phase outputs U, V, W are connected to the electrical machine 14.

The converter system furthermore comprises a charging transformer 40, which, with its primary windings, is connected via a circuit breaker 42 to a low voltage grid 44 and, with its secondary windings is connected to the star point Y and the middle points 32, A, B, C of the DC links 24 of the high phase modules 18b. The module side star point Y' of the secondary windings is connected via a relay 46 with the star point Y of the converter phases. The other sides of the secondary windings are connected via a relay 48 to the respective middle point 32, A, B, C of the high phase module 18b.

Additionally, the converter system 10 comprises a controller 50, which controls the phase modules and in particular the semiconductor switches 38, the relays 46, 48 and the circuit breaker 42.

Figure 2:
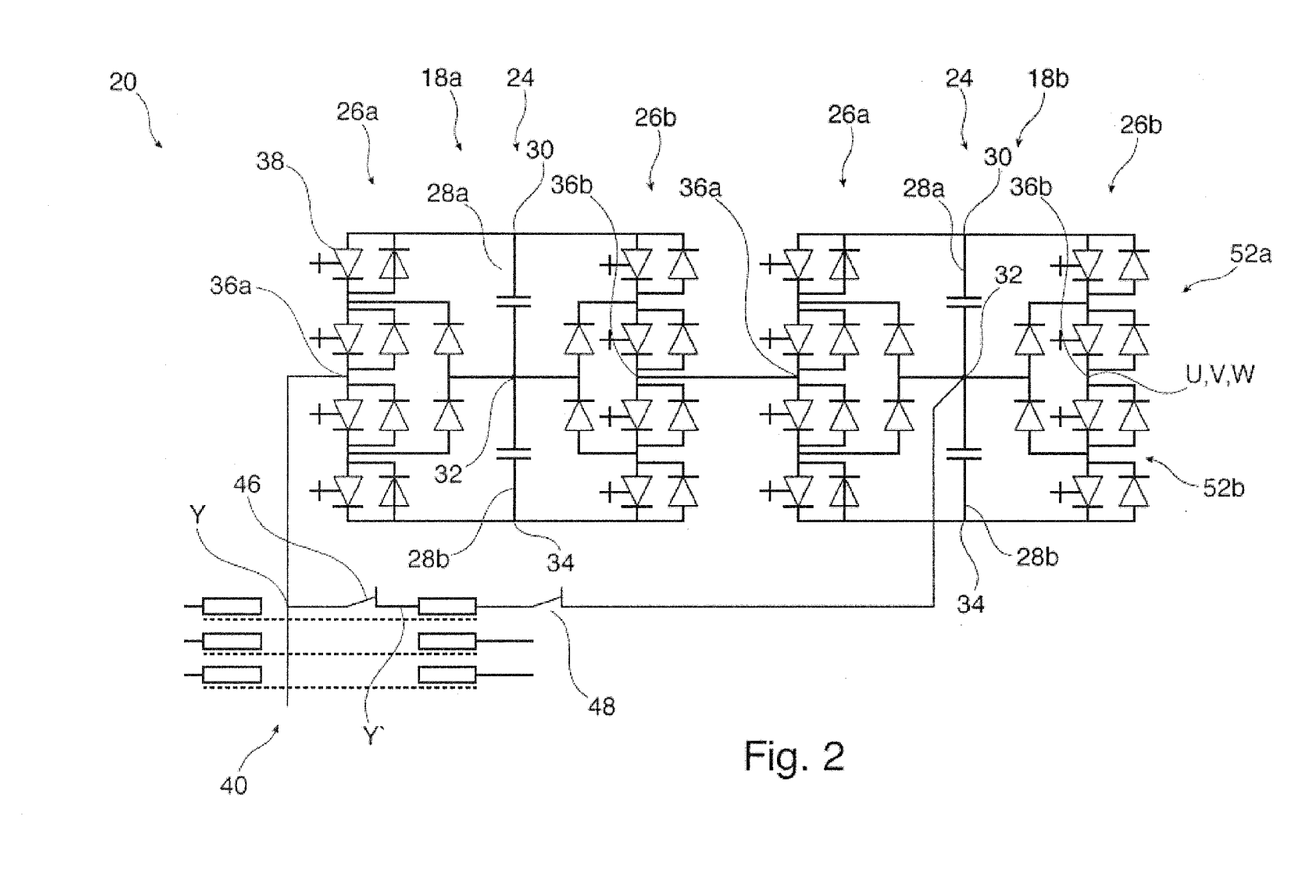
FIG. 2 schematically shows two series connected phase modules of a converter phase of the converter system of FIG. 1.

FIG. 2 shows one converter phase 20 of the converter system 10. From the phase modules 18a, 18b, the rectifiers 22 have been omitted for reasons of clarity. FIG. 2 shows, that the star point of the secondary winding of the charging transformer 40 is connected to the star point Y of the converter phases 20 and that on the other side, the secondary winding is connected to the middle point 32 of the high phase module 18b. In the case, the converter phase 20 has more than two phase modules 18a, 18b connected in series, the star point of the converter phase 20 is connected to the lowest phase module 18 in this series connection and the secondary winding of the charging transformer is connected to the highest phase module 18, that also provides the phase output U, V, W.

In general, the converter legs 26a, 26b may be neutral point clamped converter legs, active neutral point clamped converter legs or neutral point piloted converter legs. In FIG. 2 and also the other figures, neutral point converter legs 26a, 26b are shown. The converter legs 26a, 26b comprise a positive branch 52a comprising two series connected semiconductor switches 38, each semiconductor switch 38 connected in parallel to a freewheeling diode and a negative branch 52b comprising two series connected semiconductor switches 38, each semiconductor switch 38 connected in parallel to a further freewheeling diode. The positive branch 52a and the negative branch 52b are connected in series between the positive point 30 and the negative point 34. The respective output 36a, 36b of the converter leg 26a, 26b is connected via a diode between the semiconductor switches 38 of the positive branch 52a and via a diode between the semiconductor switches 38 of the negative branch 52b.

Figures 3, 4:
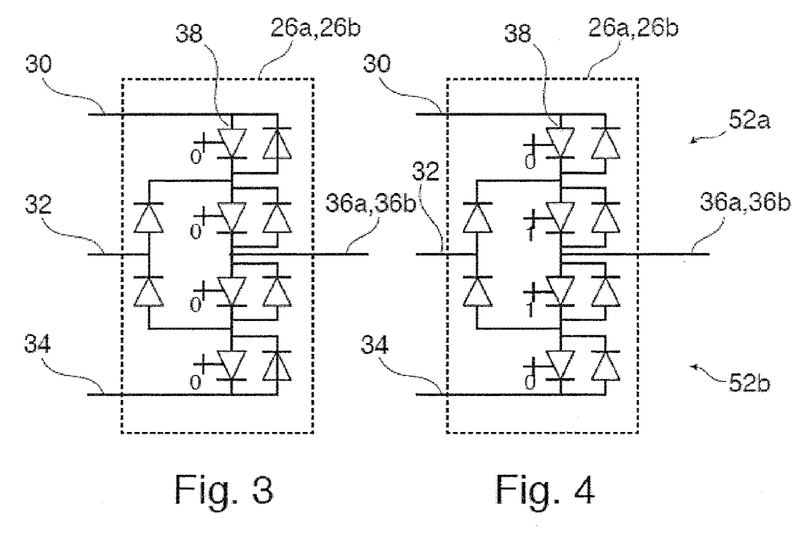
FIG. 3 schematically shows a converter leg of a phase module of the converter system of FIG. 1 in an unconnected state.
FIG. 4 schematically shows a converter leg of a phase module of the converter system of FIG. 1 in a neutral connected state.

FIGS. 3 and 4 show two different switching states of a converter leg 26a, 26b. In FIG. 3, the converter leg 26a, 26b is switched to "not connected", i.e. in an unconnected state. In particular, the semiconductor switches 38 are all open (as indicated by "0"). In FIG. 4, the converter leg 26a, 26b is switched to "zero", i.e. in a neutral connected state, in which the outer two semiconductor switches 38 of the positive branch 52a and the negative branch 52b are open and the inner two semiconductor switches are closed (as indicated by "1").

The charging of the DC link capacitors 28a, 28b may be performed with these two switching states as will be explained with respect to the following figures.

Figure 5:
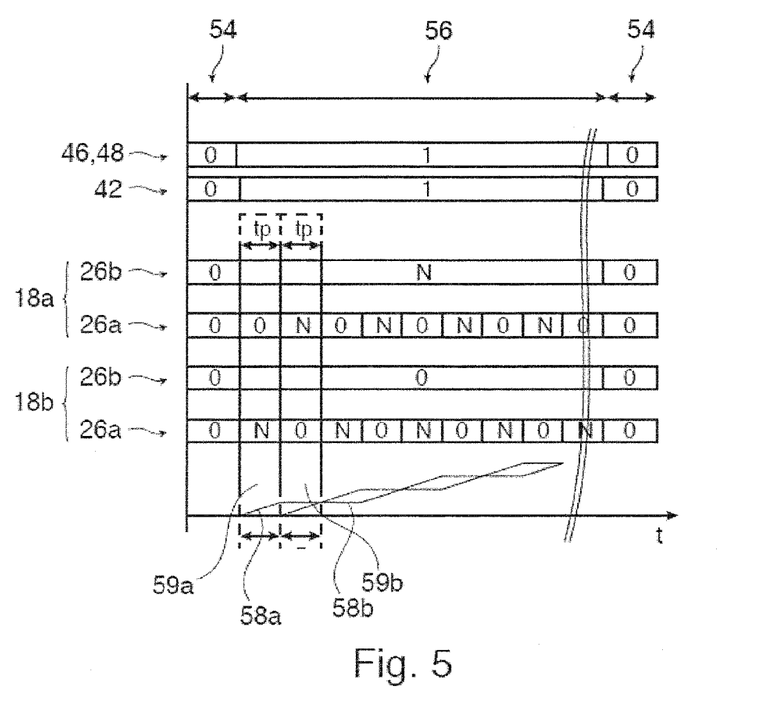
FIG. 5 shows a diagram describing switching patterns for converter legs for the phase modules of FIG. 2.
Figure 6:
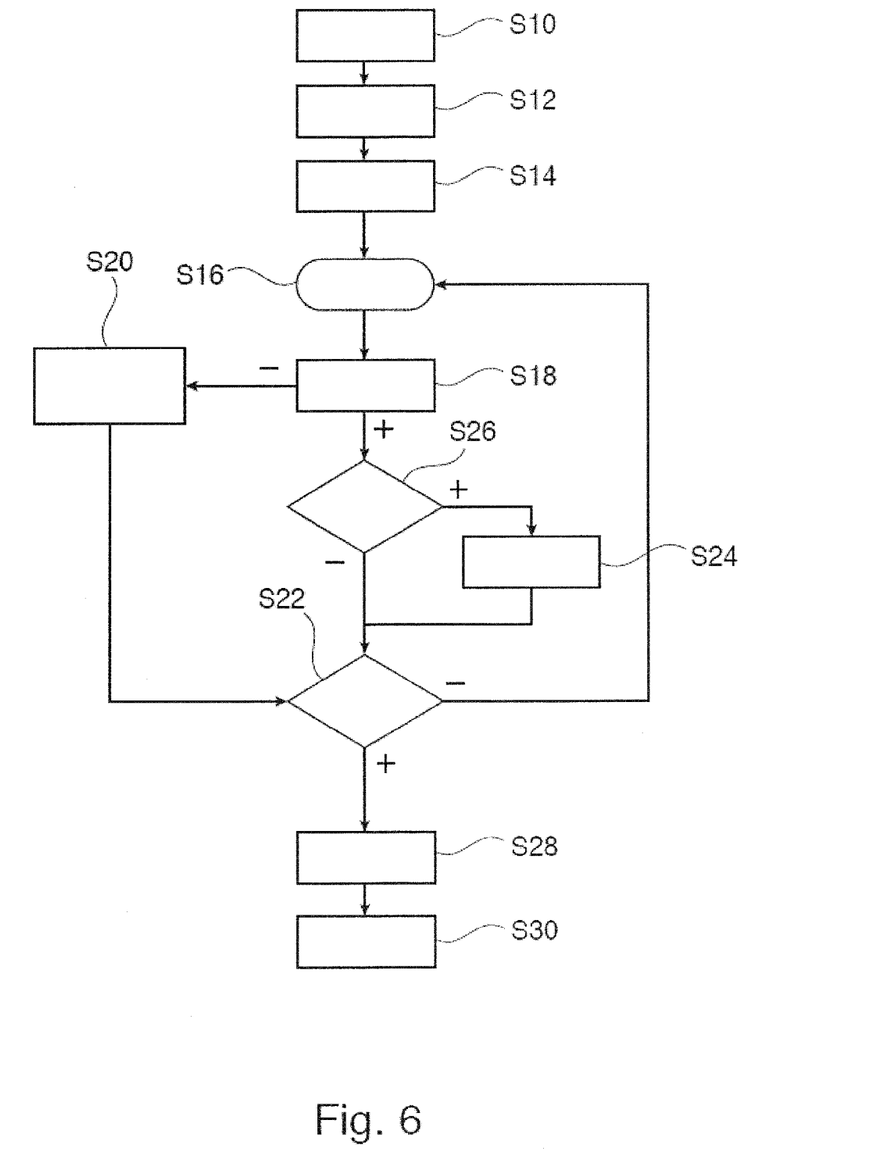
FIG. 6 shows a flow diagram for a method for charging the DC links of the converter system of FIG. 1.

FIG. 5 shows a diagram with switching states of the relays 46, 48 and the phase modules 18a, 18b of one converter phase 20. All converter phases 20 may be switched simultaneously in such a way. FIG. 6 shows a flow diagram for a method of charging the DC links 24 that will be described with respect to FIG. 5. The method may be performed automatically by the controller 50, for example as a computer program.

In an idle state 54, the circuit breaker 42 and the relays 46, 48 are open ("0"). All converter legs 26a, 26b of all phase modules 18a, 18b are in the unconnected state ("0", all semiconductor switches off).

In step S10, the charging transformer 40 is connected to the low voltage electrical grid 44 by closing the circuit breaker 42 and the system 10 changes into a charging state 56 (see FIG. 5).

In a start-up sequence, the high voltage relays 46, 48 are closed ("1") in step S12 and after that, in step S14 the low voltage breaker 42 is closed.

After that, the charging sequence starts in step S16. The second converter leg 26b of the high(est) phase module 18b remains in the unconnected state. The second converter leg 26b of the converter module 18a is switched to the neutral connected state ("N", only inner switches 38 on). In general, in the case of more than two phase modules 18a, 18b, all second converter legs 26b except the highest one are switched to a neutral connected state, in which the output 36 of the converter leg 26a, 26b is connected to the middle point 32 of the DC link 24. It has to be understood that in this context "connected" means that the respective converter leg 26a, 26b is switched in such a way, that a current may flow from the output 36a, 36b to the middle point 32 of the DC link 24.

In step S18, the initialisation is checked, if this has not been done before, timers, enables etc. are initialised in step S20 and in step S22 it is checked, whether the desired charging level has been reached.

FIG. 5 shows two curves with the DC link voltage 58a of the DC link 24 of the phase module 18a and the DC link voltage 58b of the DC link 24 of the phase module 18b. The desired charging level may be reached, when both voltages are higher than a predefined value.

During the charging state, the DC links 24 are sequentially charged. This is done by switching the first converter leg 26a of the phase module 18a to the unconnected state ("0") and the first converter leg 26a of the phase module 18b to the neutral connected state ("N"). With these switching states, the DC link 24 of the phase module 18a starts charging. FIG. 5 exemplary shows two different switching patterns 59a, 59b, in which the converter module 18a and the converter module 18b, respectively, are selected alternately for charging.

In general, after a time interval tp, the first pattern 59a is changed, in which another first converter leg 26a of a selected converter module (such as 18b) is switched to the unconnected state ("0"), while the other first converter leg(s) 26a are switched to the neutral connected state. Now the DC link 24 of the selected phase module starts charging.

Again after a time interval tp, another phase module is selected with the switching pattern 59b and the respective DC link 24 is then charged. This sequence is repeated cyclically until the DC links 24 are fully charged.

This sequence may be performed by switching the converter legs 26a in step S24 into the specific pattern 59a, 59b, when it has been detected in step S26 that the end of time interval tp has been reached. The loop between S16 and S22 is performed until the desired charging level has been reached.

If the interval time tp is chosen much smaller than the complete charging time (for example about 100 ms), then the DC links 24 charge nearly simultaneously. In this case it is also not important which phase module 18a, 18b starts to charge.

However, if tp is chosen long (for example more than 1 s), then the sequence may need to start with the highest phase module 18b. If not, the charging voltage may also be applied to the electrical machine 14 respectively the charging transformer 40 is shorted by the machine.

For example, the interval may be about 100 ms. As a rule, the interval tp should not be exactly an odd multiple of the half the network period (for example 10 ms or 8.33 ms) because this may lead to an unbalanced charging of the positive and negative DC link halves 28a, 28b.

When the desired charging level has been reached in step S22, the system changes back into the idle state 54. All converter legs are switched to the unconnected state ("0"). In the end, the high voltage relays 46, 48 are opened in step S28 and after that, the low voltage breaker 42 is opened in step S30.

In general, the high voltage relays 46, 48 should not be closed before the switching sequence is activated. Otherwise the charging can start asymmetrically. The timing is however not that critical, therefore it is sufficient to close high voltage relays 46, 48 at the same time the sequence is started.

FIGS. 7 to 10 show diagrams analogously to FIG. 2 but additionally show the charging current 60 at different phases of the charging sequence.

Figure 7:
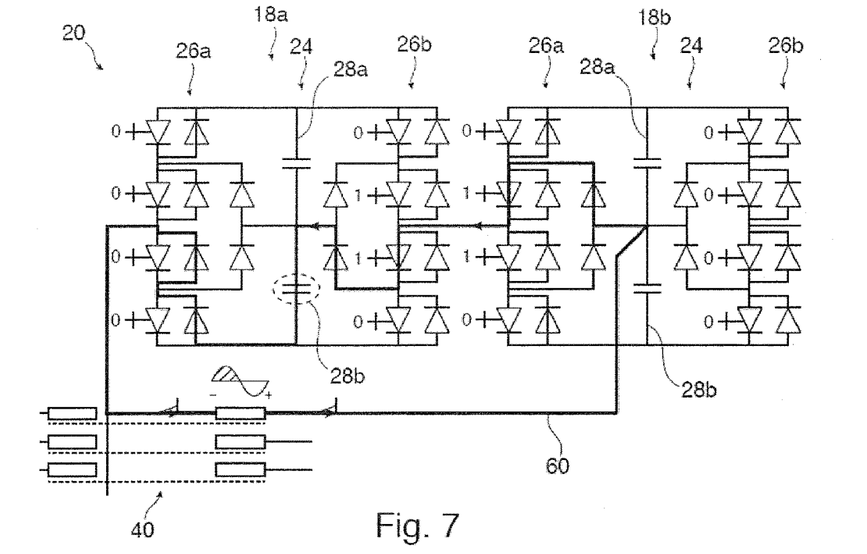
FIGS. 7 to 10 schematically show charging currents during two series connected phase modules as shown in FIG. 2.
Figure 8:
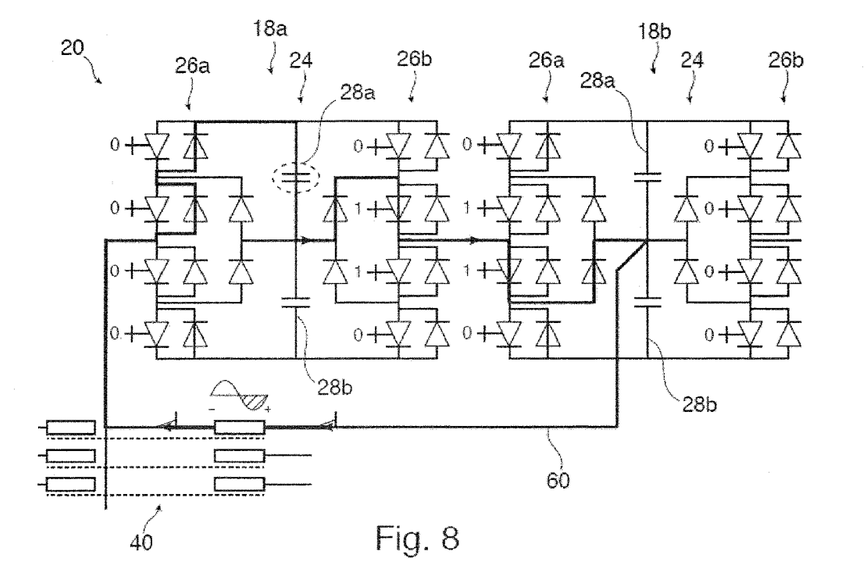

FIGS. 7 and 8 show a converter phase 20, in which the first converter leg 26a of the phase module 18a and the second converter leg 26b of the charging module 18b are switched to the unconnected state ("0"). The second converter leg 26b of the phase module 18a and the first converter leg 26a of the charging module 18b are switched to the neutral connected state ("N"). This corresponds to the first switching pattern shown in FIG. 5.

The charging current 60 flows via the neutral connected converter legs 26a, 26b from the middle point 32 of the DC link 24 of the converter module 18b through one of the capacitors 28a, 28b of the DC link 24 depending on the voltage cycle of the charging voltage from the transformer 40. In particular, the charging current 60 flows through the freewheeling diodes of the first converter leg 26a of the converter module 18a.

As shown in FIG. 7, the lower, negative DC link capacitor 28b of the selected phase module 18a is charged, when the charging voltage is in the positive cycle.

As shown in FIG. 8, the upper, positive DC link capacitor 28a of the selected phase module 18a is charged, when the charging voltage is in the positive cycle.

Figure 9:
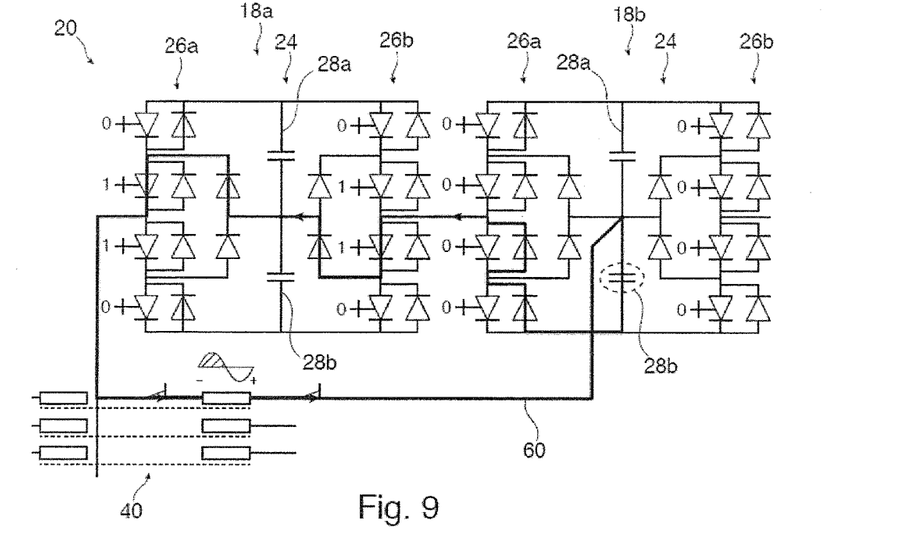
Figure 10:
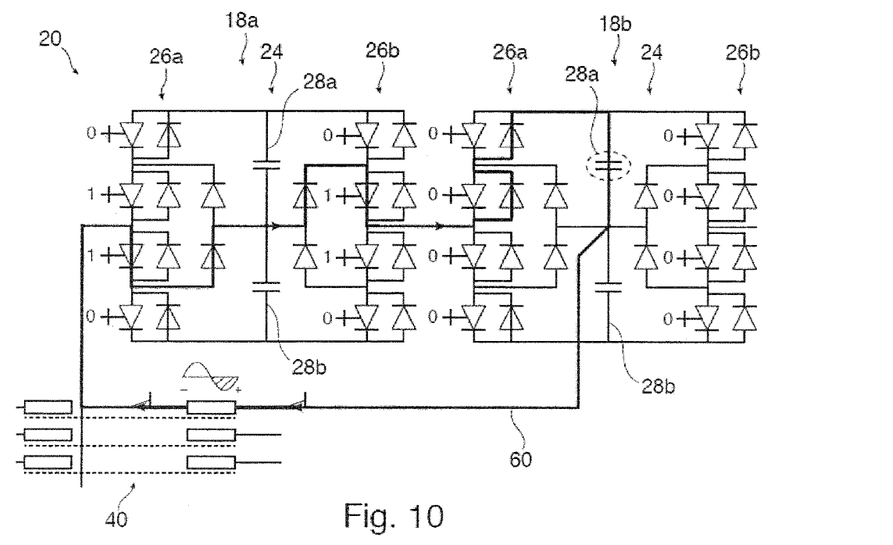

FIGS. 9 and 10 show the converter phase 20, in which the first converter leg 26a and the second converter leg 26b of the charging module 18a are switched to the neutral connected state ("0") and the first converter leg 26a and the second converter leg 26b of the phase module 18b are switched to the unconnected state ("0"). This corresponds to the second switching pattern shown in FIG. 5.

In this case, the charging current 60 flows through the freewheeling diodes of the first converter leg 26a of the converter module 18b through one of the capacitors 28a, 28b of the DC link 24 of the phase module 18b depending on the voltage cycle of the charging voltage from the transformer 40.

As shown in FIG. 9, the lower, negative DC link capacitor 28b of the selected phase module 18b is charged, when the charging voltage is in the positive cycle.

As shown in FIG. 10, the upper, positive DC link capacitor 28a of the selected phase module 18b is charged, when the charging voltage is in the positive cycle.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE NUMERALS 10 converter system
12 medium voltage grid
14 electrical machine
16 main transformer
18 phase module
18a low phase module
18b high phase module
20 converter phase
22 rectifier
24 DC link, split DC link
26a, 26b converter leg
28a, 28b capacitor
30 positive point of DC link
32 middle point of DC link
34 negative point of DC link
36a, 36b output of converter leg
38 semiconductor switch
Y, Y' star point
U, V, W phase outputs
40 charging transformer
42 circuit breaker
44 low voltage grid
46, 48 relay
50 controller
52a positive branch
52b negative branch
54 idle state
56 charging state
58a, 58b DC link voltage
59a, 59b switching patterns during charging
60 charging current

The invention claimed is:

1. A converter system, comprising:
at least two phase modules, each phase module comprising a first converter leg and a second converter leg interconnected with a DC link;
a charging transformer for charging the DC link;
wherein the DC link comprises two capacitors connected in series between a positive point, a middle point and a negative point, each converter leg being adapted for interconnecting an output with the positive point, the middle point or the negative point of the DC link;
the phase modules are connected in series via outputs of the converter legs, such that a second converter leg of a lower phase module is connected with a first converter leg of a higher phase module;
the charging transformer is connected to the middle point of the DC link of a highest phase module, which provides a phase output of the converter system with an output of a second converter leg;
at least two converter phases, each converter phase comprising at least two series connected phase modules;
wherein at a star point of the converter phases the converter phases are star-connected via outputs of the first converter legs of lowest converter modules, which are series connected with higher converter modules; and
wherein a module side star point of the charging transformer is connected with the star point of the converter phases.

2. The converter system of claim 1,
wherein the converter legs are neutral point clamped converter legs, active neutral point clamped converter legs or neutral point piloted converter legs.

3. The converter system of claim 1, wherein each converter leg comprises:
a positive branch comprising two series connected semiconductor switches, each semiconductor switch connected in parallel to a freewheeling diode;
a negative branch comprising two series connected semiconductor switches, each semiconductor switch connected in parallel to a freewheeling diode;
wherein the positive branch and the negative branch are connected in series between the positive point and the negative point.

4. The converter system of claim 3,
wherein the output of the converter leg is connected via a diode between the semiconductor switches the positive branch and via a diode between the semiconductor switches the negative branch.

5. The converter system according to claim 1, further comprising:
a main transformer interconnected with a rectifier of each converter module, which is now connected in parallel to the DC link.

6. The converter system according to claim 1,
wherein a relay for disconnecting the charging transformer from the star point of the converter phases is interconnected between the star point of the transformer and the star point of the converter phases.

7. The converter system according to claim 1, further comprising:
a circuit breaker for connecting the charging transformer to a low voltage grid.

8. A converter system, comprising:
at least two phase modules, each phase module comprising a first converter leg and a second converter leg interconnected with a DC link; and
a charging transformer for charging the DC link;
wherein the DC link comprises two capacitors connected in series between a positive point, a middle point and a negative point, each converter leg being adapted for interconnecting an output with the positive point, the middle point or the negative point of the DC link;
the phase modules are connected in series via outputs of the converter legs, such that a second converter leg of a lower phase module is connected with a first converter leg of a higher phase module;

the charging transformer is connected to the middle point of the DC link of a highest phase module, which provides a phase output of the converter system with an output of a second converter leg;

at least two converter phases, each converter phase comprising at least two series connected phase modules;

wherein at a star point of the converter phases the converter phases are star-connected via outputs of first converter legs of lowest converter modules, which are series connected with higher converter modules; and wherein a module side star point of the charging transformer is not connected with the start point of the converter phases.

9. The converter system of claim 8, wherein each converter leg comprises:

a positive branch comprising two series connected semiconductor switches, each semiconductor switch connected in parallel to a freewheeling diode;

a negative branch comprising two series connected semiconductor switches, each semiconductor switch connected in parallel to a freewheeling diode;

wherein the positive branch and the negative branch are connected in series between the positive point and the negative point.

10. The converter system of claim 9, wherein the output of the converter leg is connected via a diode between the semiconductor switches of the positive branch and via a diode between the semiconductor switches of the negative branch.

11. The converter system according to claim 8, further comprising a main transformer interconnected with a rectifier of each converter module, which is now connected in parallel to the DC link.

12. The converter system according to claim 8, wherein a relay for disconnecting the charging transformer from the star point of the converter phases is interconnected between the star point of the transformer and the star point of the converter phases.

13. The converter system according to claim 8, further comprising a circuit breaker for connecting the charging transformer to a low voltage grid.

14. A method for charging a DC link of series connected converter modules of a converter system, the method comprising:

providing the converter system comprising:

at least two phase modules, each phase module comprising a first converter leg and a second converter leg interconnected with a DC link;

a charging transformer for charging the DC link;

wherein the DC link comprises two capacitors connected in series between a positive point, a middle point and a negative point, each converter leg being adapted for interconnecting an output with the positive point, the middle point or the negative point of the DC link;

the phase modules are connected in series via outputs of the converter legs, such that a second converter leg of a lower phase module is connected with a first converter leg of a higher phase module;

the charging transformer is connected to the middle point of the DC link of a highest phase module, which provides a phase output of the converter system with an output of a second converter leg;

at least two converter phases, each converter phase comprising at least two series connected phase modules;

wherein at a star point of the converter phases the converter phases are star-connected via outputs of the first converter legs of lowest converter modules, which are series connected with higher converter modules; and wherein a module side star point of the charging transformer is connected with the star point of the converter phases connecting the charging transformer to an electrical grid;

switching a converter leg of a selected converter module into an unconnected state, in which all semiconductor switches of the converter leg are open;

switching remaining converter legs to a neutral connected state, in which the output of the remaining converter legs is connected to the middle point of the DC link;

such that a charging current flows via the neutral connected converter legs from the middle point of the DC link of the selected converter module through one of the capacitors of the DC link.

15. The method of claim 14, wherein switching the converter leg of a selected converter module and switching the remaining converter legs is a first switching pattern for charging the DC link of the selected converter module;

the method further comprising:

after a predetermined time interval, switching a further converter leg of a further selected converter module into an unconnected state and switching further remaining converter legs to a neutral connected state according to a second switching pattern for charging a further DC link of the further selected converter module.

16. The method of claim 15, wherein converter modules of a converter phase are cyclically selected and the switching patterns are applied cyclically to the selected converter module, such that the DC links of the series connected phase modules are equally charged.

17. The method according to claim 14, further comprising:

switching the second converter leg of a highest converter module to the unconnected state and/or wherein the charging current flows through freewheeling diodes of opened semiconductor switches of the first converter leg of the selected converter module.

18. A controller for a converter system adapted for performing the method according to claim 14.

19. The method according to claim 15, further comprising:

switching the second converter leg of a highest converter module to the unconnected state and/or wherein the charging current flows through freewheeling diodes of opened semiconductor switches of the first converter leg of the selected converter module.

20. The method according to claim 16, further comprising:

switching the second converter leg of a highest converter module to the unconnected state and/or wherein the charging current flows through freewheeling diodes of opened semiconductor switches of the first converter leg of the selected converter module.

* * * * *